United States Patent
Yajima

(10) Patent No.: US 8,810,831 B2
(45) Date of Patent: Aug. 19, 2014

(54) PRINT CONTROL APPARATUS, IMAGE FORMING APPARATUS AND COMPUTER READABLE MEDIUM STORING PROGRAM

(75) Inventor: Masahiko Yajima, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 185 days.

(21) Appl. No.: 12/957,690

(22) Filed: Dec. 1, 2010

(65) Prior Publication Data

US 2011/0075188 A1 Mar. 31, 2011

Related U.S. Application Data

(63) Continuation-in-part of application No. 12/852,025, filed on Aug. 6, 2010, now abandoned.

(30) Foreign Application Priority Data

Sep. 10, 2009 (JP) .................. 2009-209564
Aug. 30, 2010 (JP) .................. 2010-192048

(51) Int. Cl.
*G06F 21/62* (2013.01)

(52) U.S. Cl.
USPC ........................................ 358/1.15

(58) Field of Classification Search
USPC ........................................ 358/1.15
See application file for complete search history.

(56) References Cited

U.S. PATENT DOCUMENTS

2004/0213615 A1* 10/2004 Nakao ..................... 400/76
2007/0046969 A1* 3/2007 Shinchi et al. ........... 358/1.13
2007/0127053 A1 6/2007 Tominaga
2008/0117452 A1 5/2008 Murakami
2008/0212142 A1* 9/2008 Hosokawa et al. ....... 358/3.28

FOREIGN PATENT DOCUMENTS

| CN | 101187964 A | 5/2008 |
|---|---|---|
| JP | A-2005-078527 | 3/2005 |
| JP | B2-4104908 | 6/2008 |

OTHER PUBLICATIONS

Apr. 1, 2014 Office Action issued in Chinese Patent Application No. 201010281075.3 (with translation).
May 19, 2014 Office Action issued in Japanese Patent Application No. 2010-192048 (with translation).

* cited by examiner

*Primary Examiner* — Marivelisse Santiago Cordero
*Assistant Examiner* — Mesfin Getaneh
(74) *Attorney, Agent, or Firm* — Oliff PLC

(57) ABSTRACT

A print control apparatus includes: a setting unit that sets a determination condition for adding authentication information necessary for performing print processing based on received print data; a determination unit that determines whether or not the received print data matches the determination condition set by the setting unit; and an adding unit that, if it is determined by the determination unit that the print data matches the determination condition, adds the authentication information to the print data.

10 Claims, 25 Drawing Sheets

FIG. 4

SECURITY DETERMINATION ITEM

| DETERMINATION ITEM | SUBJECTED TO DETERMINATION |
|---|---|
| PRINT JOB NAME | ○ |
| HEADING | — |
| OUTPUT DESTINATION | ○ |
| SECTION NAME | — |
| OUTPUT LOCATION | — |
| ⋮ | ⋮ |
| USERNAME | — |
| TRANSMISSION SOURCE IP ADDRESS | — |
| HOST NAME | — |
| LOG-IN USERNAME | — |

○ : SUBJECTED TO DETERMINATION
— : NOT SUBJECTED TO DETERMINATION

FIG. 5

SECURITY DETERMINATION CONDITION TABLE

| SECURITY DETERMINATION CONDITION ||  | NECESSITY OF AUTHENTICATION REQUEST |
|---|---|---|---|
| PRINT JOB NAME | OUTPUT DESTINATION | RETRIEVER | |
| SEPTEMBER'S BILL | OSAKA BRANCH | USER A | NECESSARY |
| SUMMER VACATION SCHEDULE | SAPPORO BRANCH | — | UNNECESSARY |
| PAY ADVICE | SENDAI BRANCH | GROUP 1 | NECESSARY |
| LIST OF SALES IN FISCAL XX | FUKUOKA BRANCH | USER B | NECESSARY |

FIG. 6

USER LIST

| | IMAGE FORMING APPARATUS 30 | IMAGE FORMING APPARATUS 31 | IMAGE FORMING APPARATUS 32 |
|---|---|---|---|
| USER A (GROUP 1) | ◯ 01234567 | ◯ 76543210 | — |
| USER B (GROUP 1) | — | ◯ 3335620 | ◯ 3335620 |
| USER C (GROUP 3) | ◯ 45699807 | — | ◯ 45699807 |
| USER D (GROUP 2) | ◯ 46235891 | ◯ 77521480 | ◯ 6980021 |

FIG. 9

GROUP CONFIDENTIAL BOX TABLE

| GROUP NAME | CORRESPONDING CONFIDENTIAL BOX NUMBER |
|---|---|
| GROUP 1 | 991 |
| GROUP 2 | 992 |
| GROUP 3 | 993 |
| GROUP 4 | 994 |

EXAMPLE OF PRINT DATA IN MISSION-CRITICAL SYSTEM

```
****************************************
*                                      *
*  SEPTEMBER'S BILL FOR XXX CARD COMPANY *
*                                      *
*                    OUTPUT DESTINATION: *
*                    OSAKA BRANCH       *
*  PRINT JOB NAME:   SECTION NAME: CARD *
*  SEPTEMBER'S BILL  DIVISION           *
*  JOB NUMBER: SRCM0101  OUTPUT LOCATION: 12TH *
*                    FLOOR, XX BUILDING *
*  NUMBER OF PAGES: 1000  USERNAME: TARO FUJI *
*                                      *
****************************************
```

90

91

92

CUSTOMER'S NAME:
XXX CARD COMPANY

RELEVANT BRANCH
CODE: 003

SECURITY DETERMINATION CONDITION TABLE

| SECURITY DETERMINATION CONDITION || RETRIEVER |
| PRINT JOB NAME | OUTPUT DESTINATION | |
| --- | --- | --- |
| SEPTEMBER'S BILL | OSAKA BRANCH | USER A |
| SUMMER VACATION SCHEDULE | SAPPORO BRANCH | — |
| PAY ADVICE | SENDAI BRANCH | GROUP 1 |
| LIST OF SALES IN FISCAL XX | FUKUOKA BRANCH | USER B |

FIG. 18

| TYPE | IC CARD AUTHENTICATION DEVICE |
|---|---|
| IMAGE FORMING APPARATUS 30 | INSTALLED |
| IMAGE FORMING APPARATUS 31 | NOT INSTALLED |
| IMAGE FORMING APPARATUS 32 | INSTALLED |

FIG. 19

| RETRIEVER | AUTHENTICATION ID (EMPLOYEE CODE) |
|---|---|
| USER A | xy02184 |
| USER B | xy09432 |
| USER C | xy13546 |
| ⋮ | ⋮ |
| USER Y | xy99001 |
| USER Z | xy98099 |

FIG. 20

| RETRIEVER | IMAGE FORMING APPARATUS 30 | IMAGE FORMING APPARATUS 31 | IMAGE FORMING APPARATUS 32 |
|---|---|---|---|
| USER A | xy02184 | — | xy02184 |
| USER B | xy09432 | — | xy09432 |
| USER C | xy13546 | — | xy13546 |
| ...... | ...... | ...... | ...... |
| USER Y | xy99001 | — | xy99001 |
| USER Z | xy98099 | — | xy98099 |

PRINT CONTROL APPARATUS, IMAGE FORMING APPARATUS AND COMPUTER READABLE MEDIUM STORING PROGRAM

CROSS-REFERENCE TO RELATED APPLICATIONS

This application is a Continuation-in-part of application Ser. No. 12/852,025 filed Aug. 6, 2010 and claims priority under 35 U.S.C. §119 from Japanese Patent Application No. 2009-209564 filed Sep. 10, 2009 and Japanese Patent Application No. 2010-192048 filed Aug. 30, 2010. The entire disclosures of the prior applications, application Ser. No. 12/852,025, JP 2009-209564 and JP 2010-192048 are considered part of the disclosure of the accompanying continuation application and are hereby incorporated by reference.

BACKGROUND

Technical Field

The present invention relates to a print control apparatus, an image forming apparatus and a computer readable medium storing a program.

SUMMARY

According to an aspect of the present invention, there is provided a print control apparatus including: a setting unit that sets a determination condition for adding authentication information necessary for performing print processing based on received print data, a determination unit that determines whether or not the received print data matches the determination condition set by the setting unit, and an adding unit that, if it is determined by the determination unit that the print data matches the determination condition, adds the authentication information to the print data.

BRIEF DESCRIPTION OF THE DRAWINGS

Exemplary embodiments of the present invention will be described in detail based on the following figures, wherein:

FIG. 4 is a view for explaining a method for selecting a determination item of a security determination condition;

FIG. 5 shows a security determination condition table for use in determination processing performed by a determination part 45 according to the first exemplary embodiment of the present invention;

FIG. 6 shows a user list to be used when an authentication request is added to a print job by an authentication information adding part 46 according to the first exemplary embodiment of the present invention;

FIG. 9 shows a group confidential box table according to the first exemplary embodiment of the present invention;

FIG. 12 shows print data to be printed in the printing system according to the first exemplary embodiment of the present invention;

FIG. 17 shows a security determination condition table for use in a second exemplary embodiment of the present invention;

FIG. 18 shows an installation state of an IC card authentication device in image forming apparatuses 30 to 32;

FIG. 19 shows a correspondence between users A to Z and authentication IDs (employee codes);

FIG. 20 shows a user list for use when the authentication information is added to the print job by the authentication information adding part 46 according to the second exemplary embodiment of the present invention;

DETAILED DESCRIPTION

Next, exemplary embodiments of the present invention will be described in detail with reference to the accompanying drawings.

First Exemplary Embodiment

Figure 1:
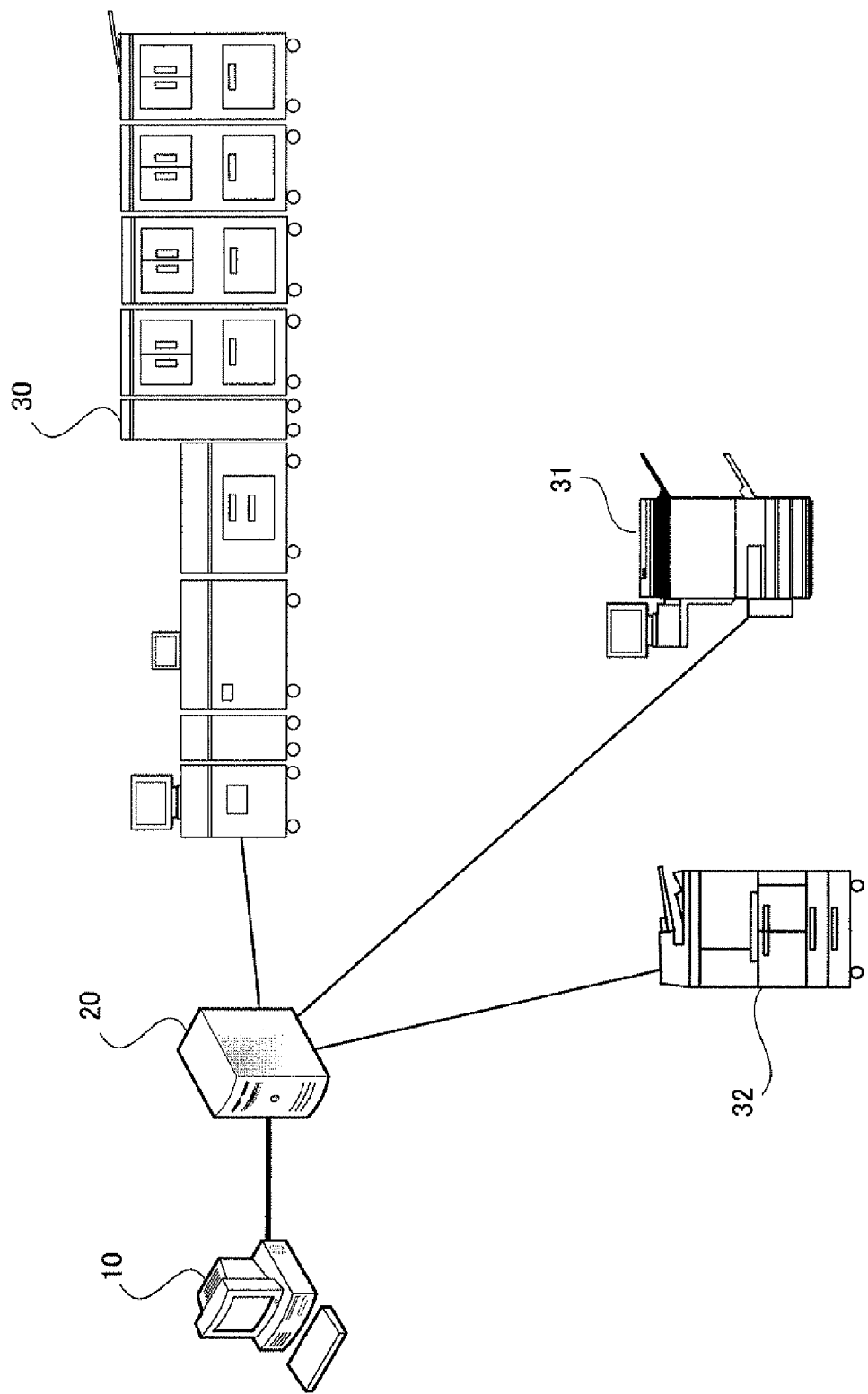
FIG. 1 shows a system configuration of a printing system according to a first exemplary embodiment of the present invention.

FIG. 1 shows a system configuration of a printing system according to the first exemplary embodiment of the invention. As shown in FIG. 1, the printing system according to the first exemplary embodiment of the present invention is composed of a terminal device 10, a print server 20, and image forming apparatuses 30 to 32.

The terminal device 10 generates a print job (a print instruction) and transmits the print job generated via a network to the print server 20. The print server 20 serves as a print control apparatus, and transmits the received print job to any of the image forming apparatuses 30 to 32. It should be noted that the print server 20 may transmit the print job to two or more of the image forming apparatuses 30 to 32. Each of the image forming apparatuses 30 to 32 receives the print job transmitted from the print server 20, and outputs an image corresponding to the received print job on a print sheet. Here, the print job is used as an example of the print instruction.

Note that the printing system according to this first exemplary embodiment includes a system for performing output operations in the production field. Also, the image forming apparatuses 30 to 32 are in separate places. The print server 20 has the function of selecting the image forming apparatus for outputting the print job received from the terminal device 10.

Figure 2:
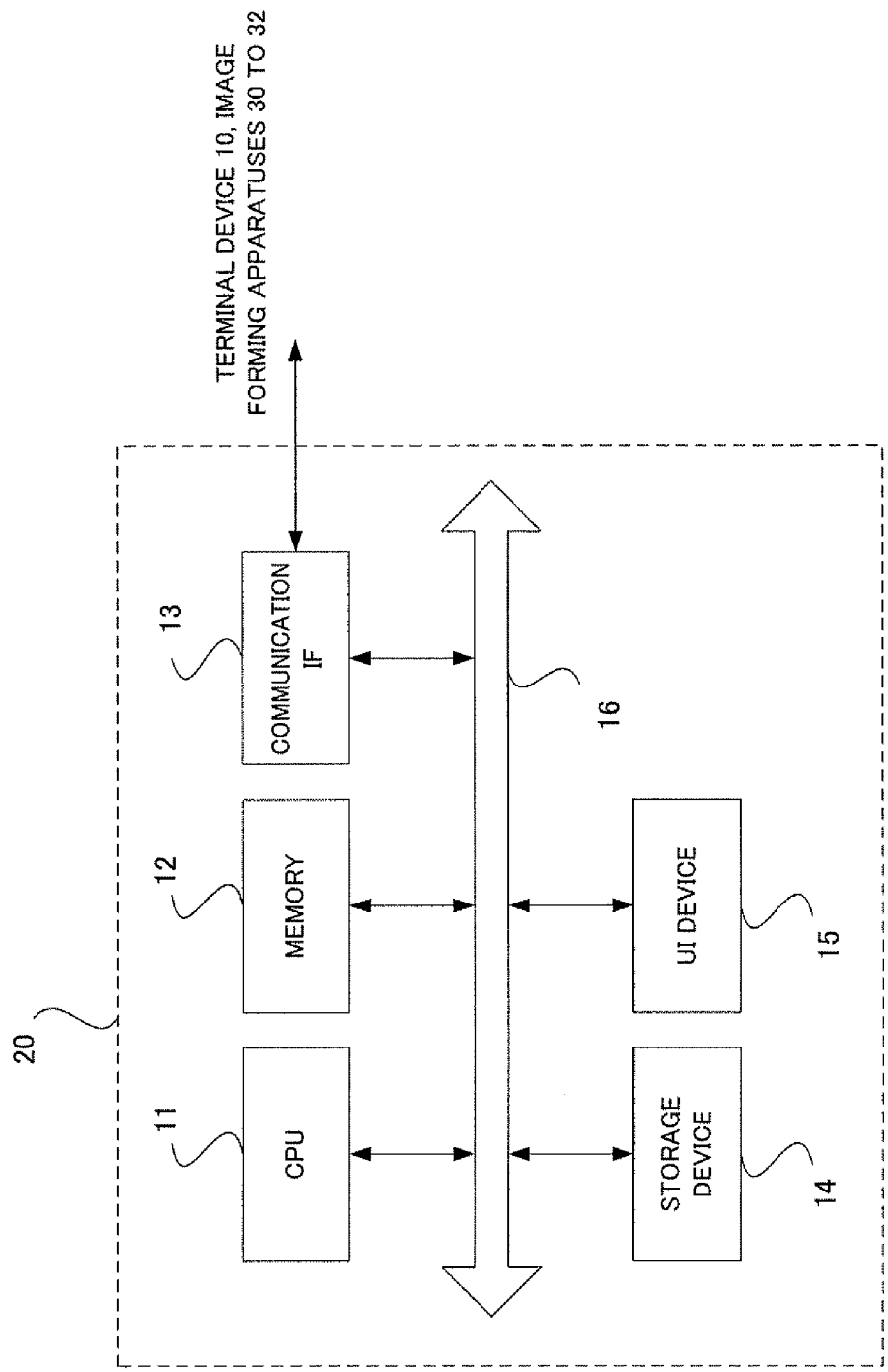
FIG. 2 is a block diagram showing a hardware configuration of a print server 20 in the first exemplary embodiment of the present invention.

Next, FIG. 2 shows a hardware configuration of the print server 20 in the printing system according to this exemplary embodiment.

As shown in FIG. 2, the print server 20 includes a CPU 11, a memory 12, a communication interface (IF) 13 for data transmission/reception between the print server 20 and an external device or the like, a storage device 14 such as a hard disk drive (HDD), and a user interface (UI) device 15 including a touch panel or a liquid crystal display and a keyboard. These elements are interconnected via a control bus 16.

The CPU 11 executes predetermined processing on the basis of a control program stored in the memory 12 or the storage device 14 to control the operation of the print server 20. It should be noted that, in this exemplary embodiment, the CPU 11 reads and executes the control program stored in the memory 12 or the storage device 14. However, the arrangement may be such that the program is stored in a storage medium such as a CD-ROM and provided to the CPU 11.

Figure 3:
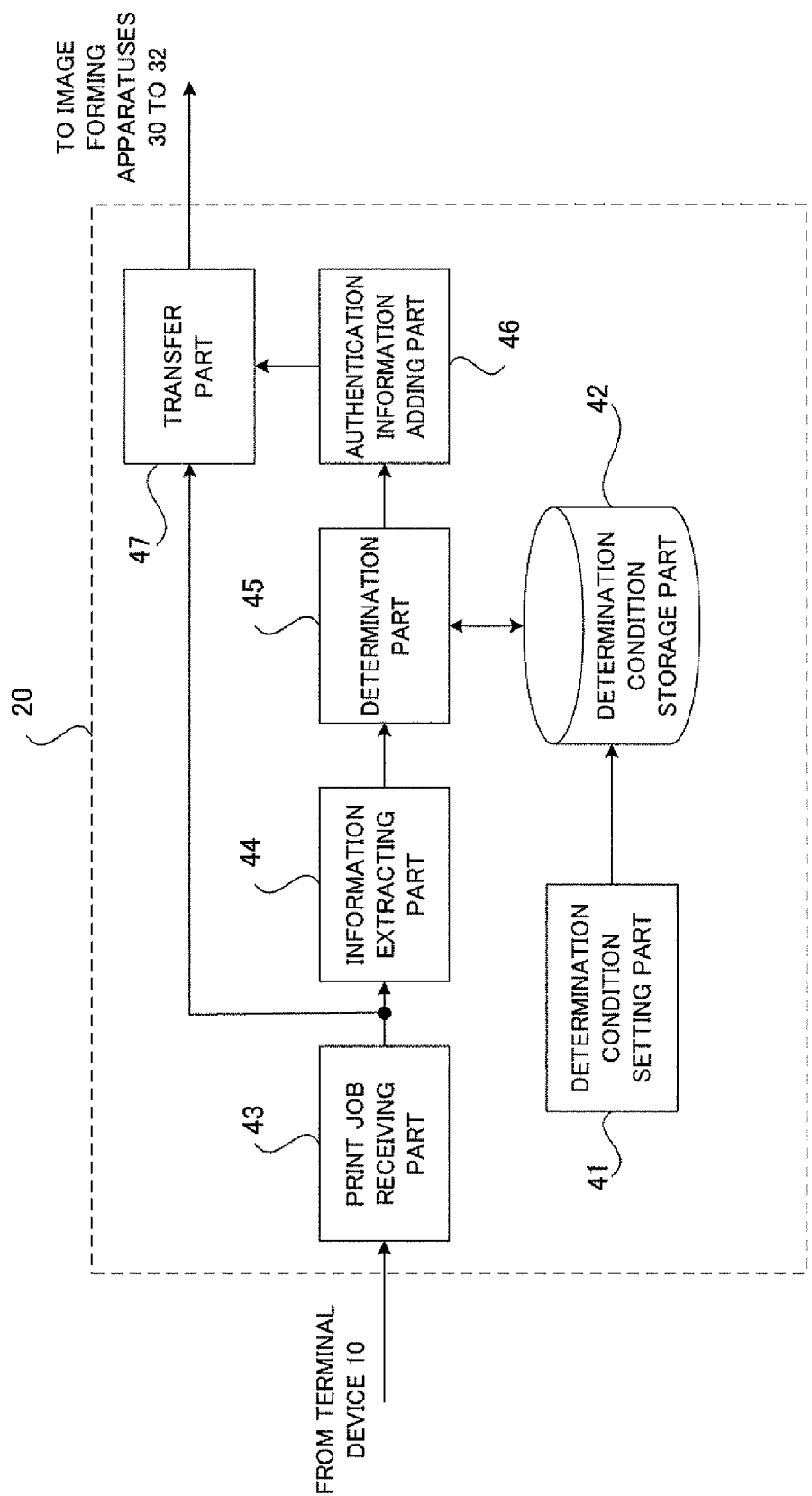
FIG. 3 is a block diagram showing a functional configuration of the print server 20 in the first exemplary embodiment of the present invention.

FIG. 3 is a block diagram showing a functional configuration of the print server 20 realized by execution of the above-described control program.

As shown in FIG. 3, the print server 20 according to this exemplary embodiment includes a determination condition setting part 41, a determination condition storage part 42, a print job receiving part 43, an information extracting part 44, a determination part 45, an authentication information adding part 46, and a transfer part 47.

The determination condition setting part 41 sets a security determination condition for determining whether or not a received print job requires authentication at the time of performing print processing based on the print job (print instruction). For example, the determination condition setting part 41 sets, as the security determination condition, whether or not information on any one of, or a combination of at least two or more of, a print job name (a print instruction name), a title (a heading), an output destination, a username (a user name), and a customer's name of the print job matches preset information.

An example of a method for selecting a determination item of the security determination condition will be described with reference to FIG. 4. The determination condition setting part 41 sets the item to be determined through selection from various determination items including the print job name, the heading, the output destination, and a section name. In the example shown in FIG. 4, two determination items, that is, the print job name and the output destination are selected.

The determination condition storage part 42 stores the security determination condition set by the determination condition setting part 41.

The print job receiving part 43 receives the print job transmitted from the terminal device 10. The information extracting part 44 extracts preset specific information from the print job received by the print job receiving part 43.

The determination part 45 determines whether or not the print job received by the print job receiving part 43 matches the security determination condition set by the determination condition setting part 41. More specifically, the determination part 45 determines whether or not the information extracted by the information extracting part 44 matches the security determination condition set by the determination condition setting part 41.

FIG. 5 shows an example of a security determination condition table for use in the determination processing performed by the determination part 45.

In the security determination condition table shown in FIG. 5, a print job name and an output destination are set as a security determination condition. For example, a condition is set for determining that the print job with "September's bill" set as a print job name and "Osaka branch" set as an output destination requires an authentication request. Also, this print job is set to designate "User A" as a retriever.

If the determination part 45 determines that the print job received by the print job receiving part 43 matches the security determination condition, the authentication information adding part 46 adds an authentication request instruction to the print job as authentication information. When the authentication request instruction is added, the print job is not printed on a print sheet; on the other hand, when authentication such as user authentication is performed, the print job is printed on a print sheet. That is to say, when the authentication request instruction is added, the print job is treated as a job requiring confidential printing. It should be noted that the authentication request instruction is used as an example of the information indicating that the print job requires authentication at the time of performing printing processing based on the print job.

In concrete terms, the authentication information adding part 46 sets a retriever and a password to the print job to be transferred by the transfer part 47, thereby adding an authentication request instruction thereto.

FIG. 6 shows an example of a user list to be used when an authentication request is added to the print job by the authentication information adding part 46.

For example, when "User A" is designated as a retriever in the determination part 45, the authentication information adding part 46 sets, on the basis of the user list shown in FIG. 6, "01234567" as a password if the output destination is the image forming apparatus 30, and "76543210" as a password if the output destination is the image forming apparatus 31. Further, when a group is designated as a retriever, the authentication information adding part 46 sets only the necessity of an authentication request and the retriever for the print job.

The transfer part 47 transfers to the image forming apparatuses 30 to 32 the print job received by the print job receiving part 43, and the print job with an authentication request instruction added thereto by the authentication information adding part 46.

Figure 7:
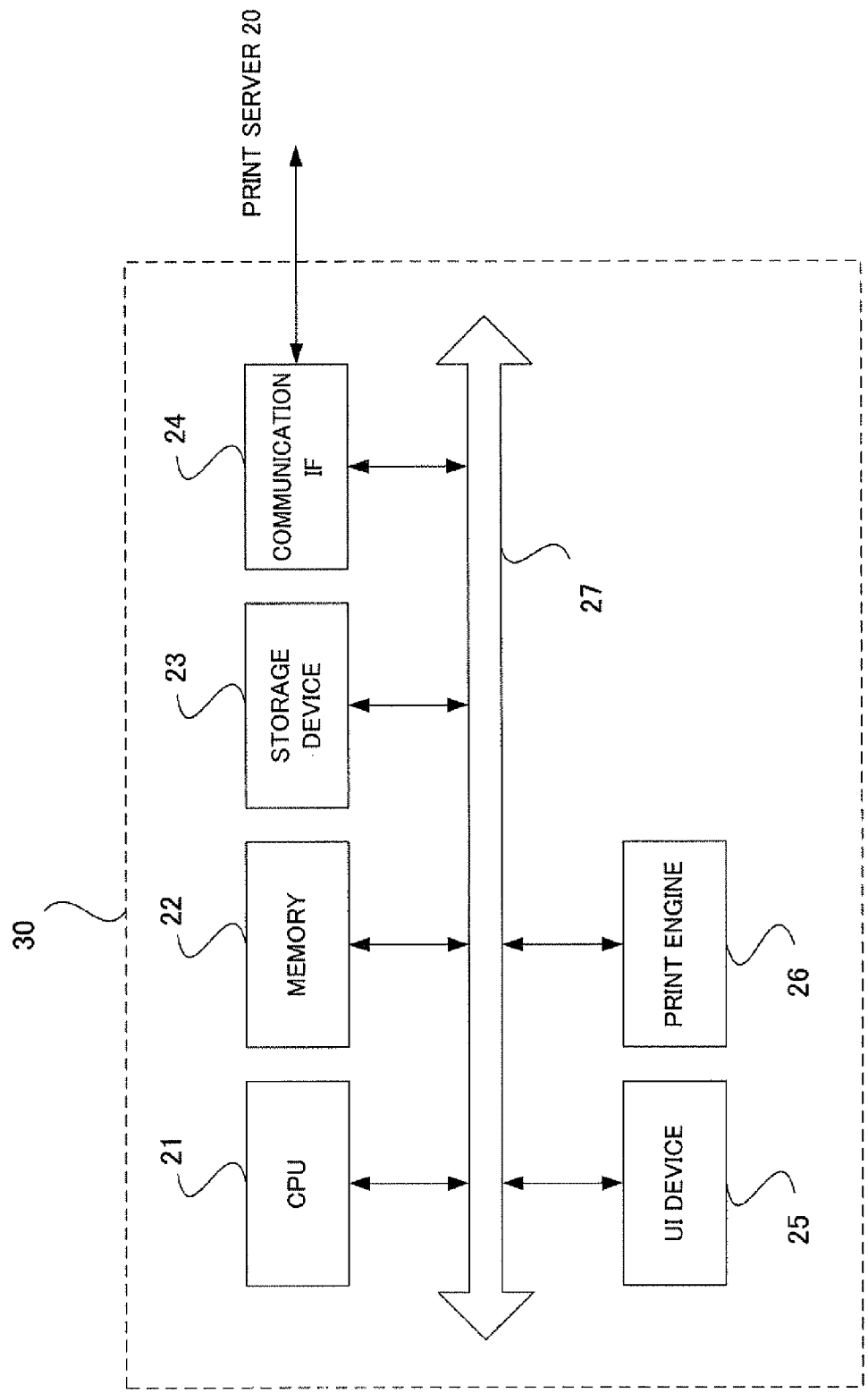
FIG. 7 is a block diagram showing a hardware configuration of an image forming apparatus 30 in the first exemplary embodiment of the present invention.

Next, FIG. 7 shows a hardware configuration of the image forming apparatus 30 in the printing system according to this exemplary embodiment. It should be noted that portions related to the present invention of the image forming apparatuses 31 and 32 have the same configuration as the image forming apparatus 30, and therefore descriptions thereof will not be made.

As shown in FIG. 7, the image forming apparatus 30 includes a CPU 21, a memory 22, a storage device 23 such as a hard disk drive (HDD), a communication interface (IF) 24 for data transmission/reception between the image forming apparatus 30 and an external device or the like via the network, a user interface (UI) device 25 including a touch panel or a liquid crystal display and a keyboard, and a print engine 26. These elements are interconnected via a control bus 27.

The CPU 21 executes predetermined processing on the basis of a control program stored in the memory 22 or the storage device 23 to control the operation of the image forming apparatus 30. It should be noted that, in this exemplary embodiment, the CPU 21 reads and executes the control program stored in the memory 22 or the storage device 23. However, the arrangement may be such that the program is stored in a storage medium such as a CD-ROM and provided to the CPU 21.

Figure 8:
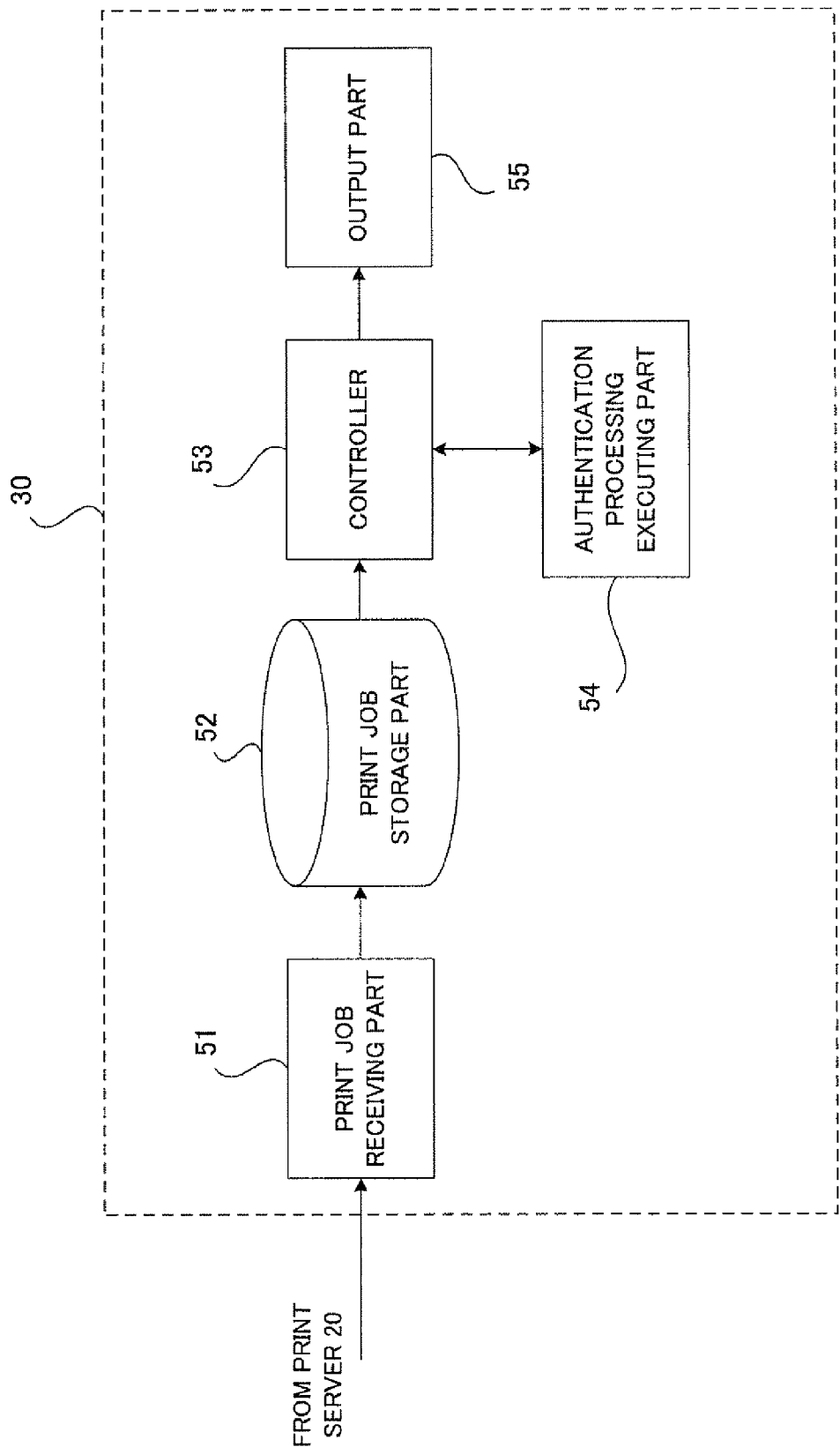
FIG. 8 is a block diagram showing a functional configuration of the image forming apparatus 30 in the first exemplary embodiment of the present invention.

FIG. 8 is a block diagram showing a functional configuration of the image forming apparatus 30 realized by execution of the above-described control program.

As shown in FIG. 8, the image forming apparatus 30 according to this exemplary embodiment includes a print job receiving part 51, a print job storage part 52, a controller 53, an authentication processing executing part 54, and an output part 55.

The print job receiving part 51 receives the print job transmitted from the terminal device 10. The print job storage part 52 stores the print job received by the print job receiving part 51.

The output part 55 outputs, under the control of the controller 53, an image on the basis of the print job received by the print job receiving part 51 and stored in the print job storage part 52. The controller 53 controls image output processing in the output part 55.

If an authentication request instruction is added to the print job to be subjected to image output processing, the authentication processing executing part 54 executes authentication processing before the execution of the print job by the output part 55. It should be noted that the authentication processing executed by the authentication processing executing part 54 may include authentication processing by password entry through a keyboard or the like, or may include authentication processing using an IC card or the like. Alternatively, the authentication processing may be performed using biometric information such as a fingerprint, a vein pattern, or an iris pattern.

Furthermore, if an authentication request instruction with a group designated as a retriever is added to the print job to be subjected to image output processing, a confidential box for storing the print job is specified based on a group confidential box table shown in FIG. 9, and the print job is stored in the specified confidential box.

Figure 10:
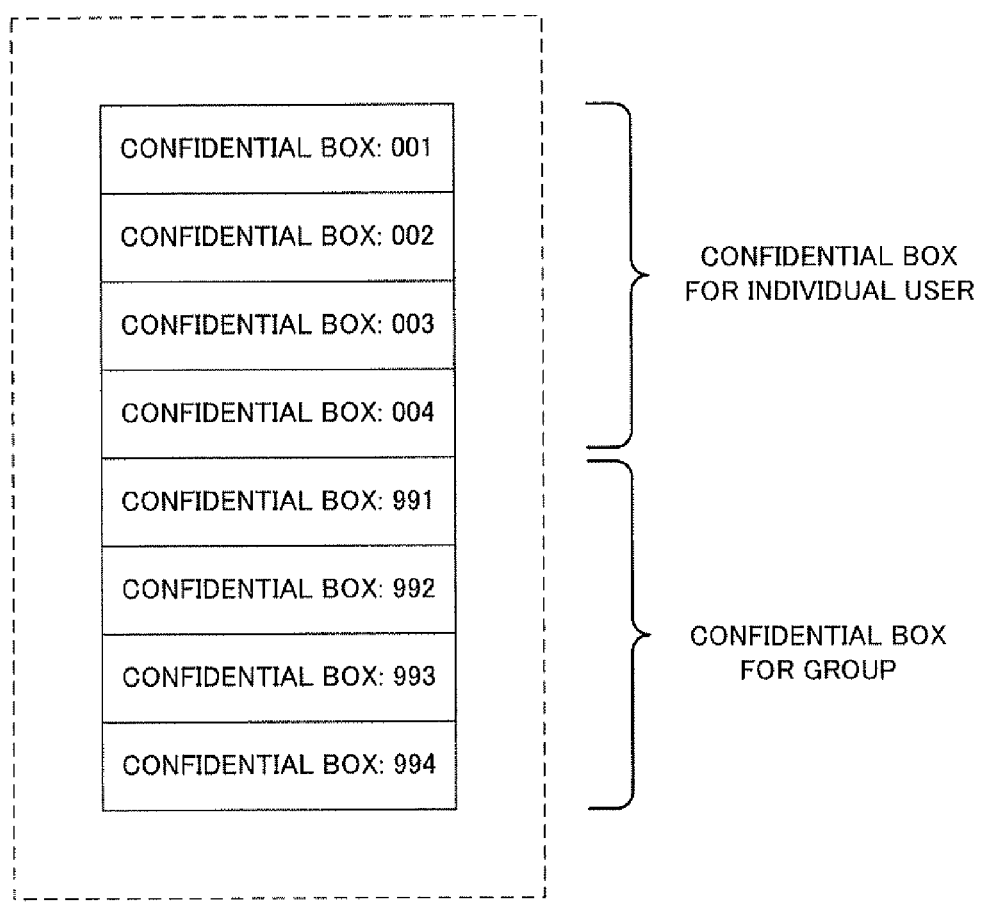
FIG. 10 shows confidential boxes set in the image forming apparatus 30 according to the first exemplary embodiment of the present invention.

FIG. 10 shows examples of confidential boxes set in the image forming apparatus 30. In FIG. 10, each of confidential boxes "001" to "004" is set to store the print job with an individual user as a retriever, while each of confidential boxes "991" to "994" is set to store the print job with a group as a retriever.

For example, the print job to which the authentication request instruction with group 1 designated as a retriever is added, is stored in the confidential box number "911". Execution of the print job stored in the confidential box number "911" requires the authentication processing by entry of a preset password.

Next, the operation of the printing system according to the exemplary embodiment of the present invention will be described in detail with reference to the accompanying drawings.

First, the operation of the print server 20 in the printing system according to this exemplary embodiment will be described with reference to the flowchart of FIG. 11.

In the print server 20, the determination part 45 previously reads a security determination condition from the determination condition storage part 42 (step S101).

When the print job receiving part 43 receives a print job from the terminal device 10 (step S102), the information extracting part 44 extracts information from the print job (step S103).

Hereinafter, a concrete description will be made, for example, in which the print data shown in FIG. 12 is received. The print data shown in FIG. 12 is composed of a first page with a banner sheet 90 containing a variety of information, and subsequent pages with plural form pages 91 to be actually used. Also, a separator sheet 92 is provided between adjacent different print data.

Figure 13:
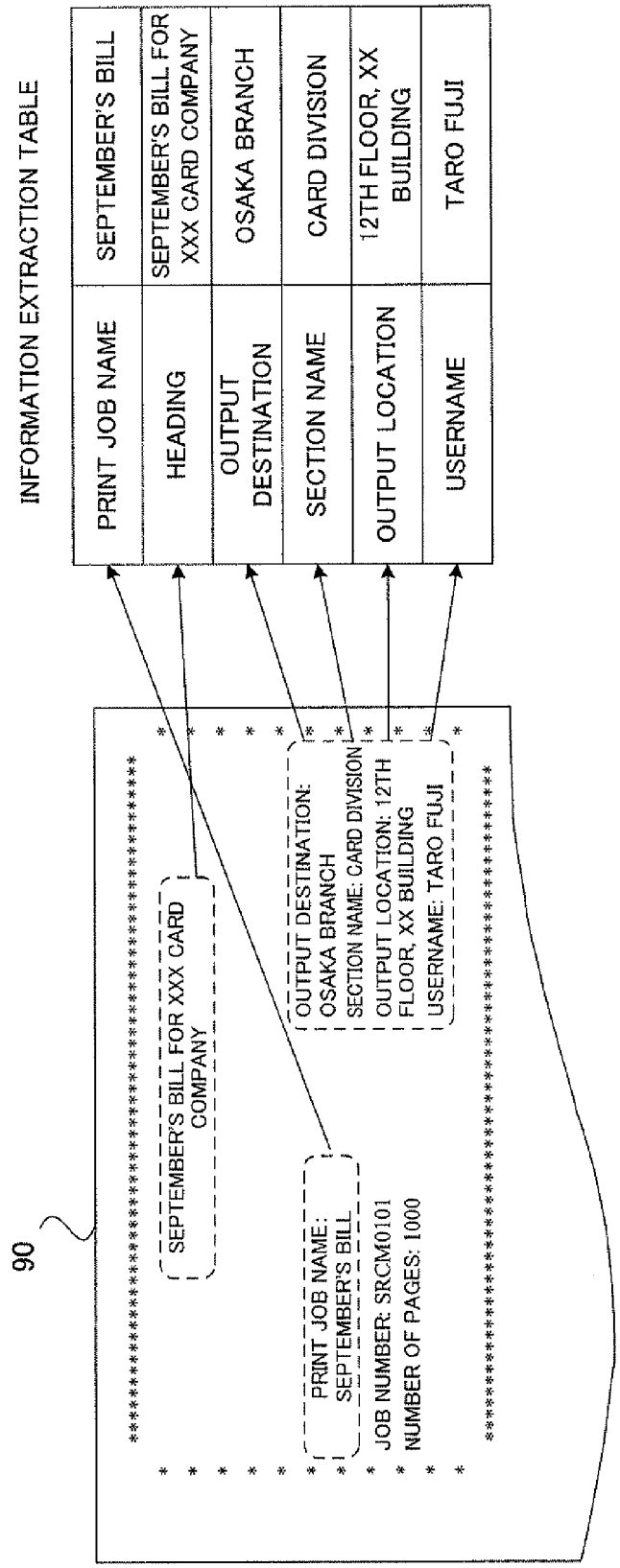
FIG. 13 shows a case of generating an information extraction table by extracting information from a banner sheet 90 according to the first exemplary embodiment of the present invention.

As shown in FIG. 13, for example, when extracting information from the banner sheet 90, the information extracting part 44 extracts information, such as a heading (title), an output destination, a section name, an output location, or a username, to generate an information extraction table.

Figure 14:
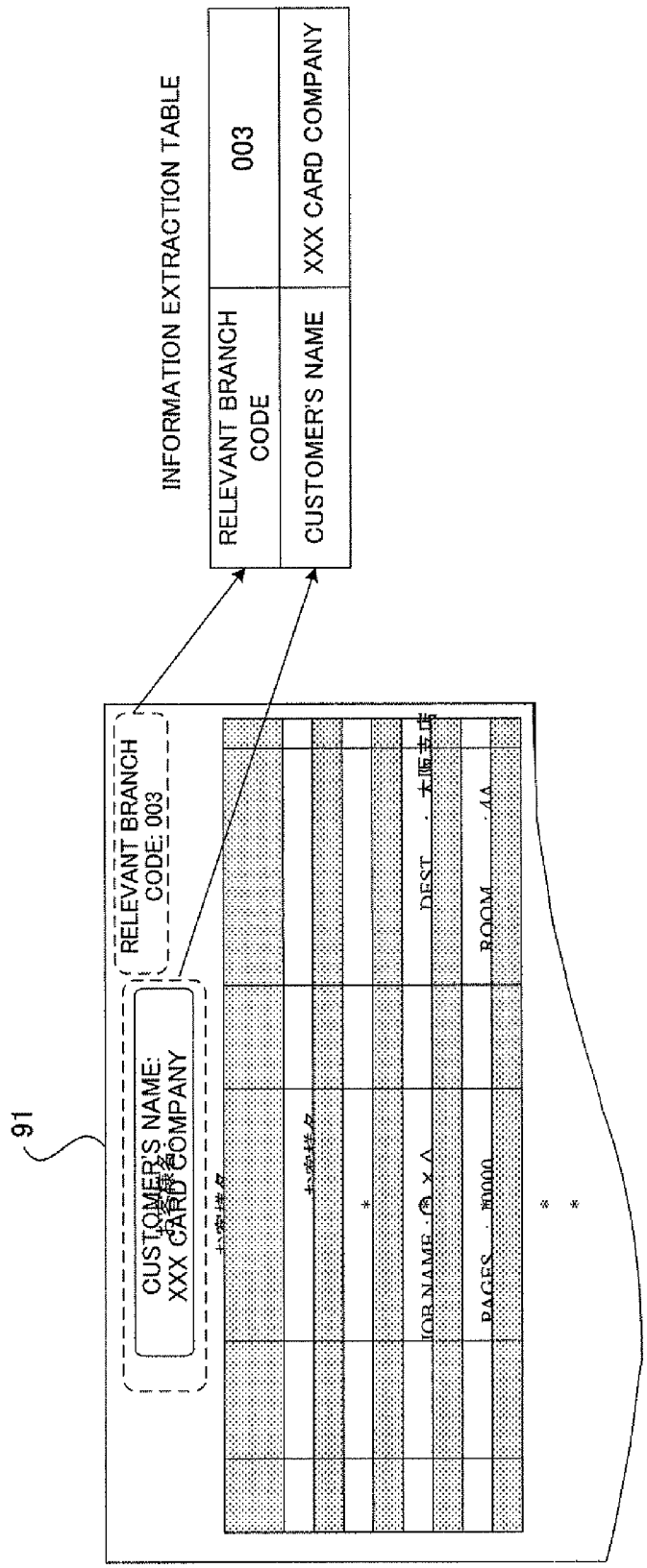
FIG. 14 shows a case of generating an information extraction table by extracting information from a form page 91 according to the first exemplary embodiment of the present invention.

Further, as shown in FIG. 14, when extracting information from the form pages 91, the information extracting part 44 extracts information, such as a relevant branch code or a customer's name, to generate an information extraction table.

Then the determination part 45 determines, on the basis of the information extraction table generated by the information extracting part 44, whether or not the print job to be transferred matches the security determination condition read from the determination condition storage part 42 (step S104).

Various kinds of authentication setting processing for setting an authentication request instruction to the print job are performed (step S105). Details of such authentication setting processing will be described later.

Additionally, the authentication information adding part 46 adds an authentication request instruction to the print job (step S106). The transfer part 47 transfers the print job with the authentication request instruction added thereto, to the image forming apparatuses 30 to 32 (step S107).

On the other hand, when the print job to be transferred does not match the security determination condition in step S104, the print job received by the print job receiving part 43 is transferred to the image forming apparatuses 30 to 32 without addition of an authentication request instruction.

Figure 15:
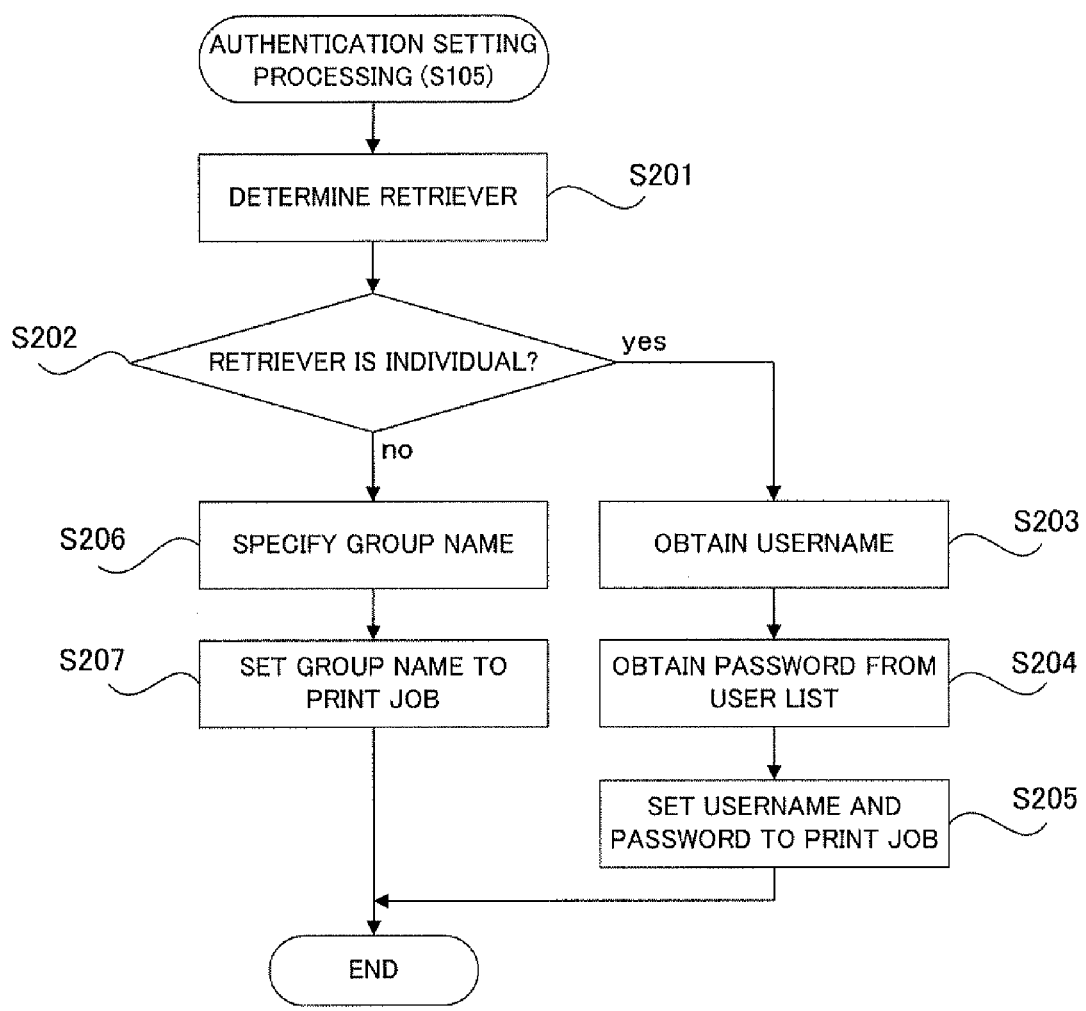
FIG. 15 is a flowchart for explaining in detail authentication setting processing shown in step S105 of FIG. 11.

Next, the details of the authentication setting processing shown in step S105 of FIG. 11 will be described with reference to the flowchart of FIG. 15.

In the authentication setting processing, a retriever is determined based on the security determination condition table shown in FIG. 5 (step S201). When the retriever is an individual (YES in step S202), obtaining of a username, obtaining of a password from the user list, and setting of the username and password to the print job are performed (steps S203 to S205).

When it is determined that the retriever is a group rather than an individual (NO in step S202), a group name is specified (step S206), and the group name is set to the print job (step S207).

Figure 16:
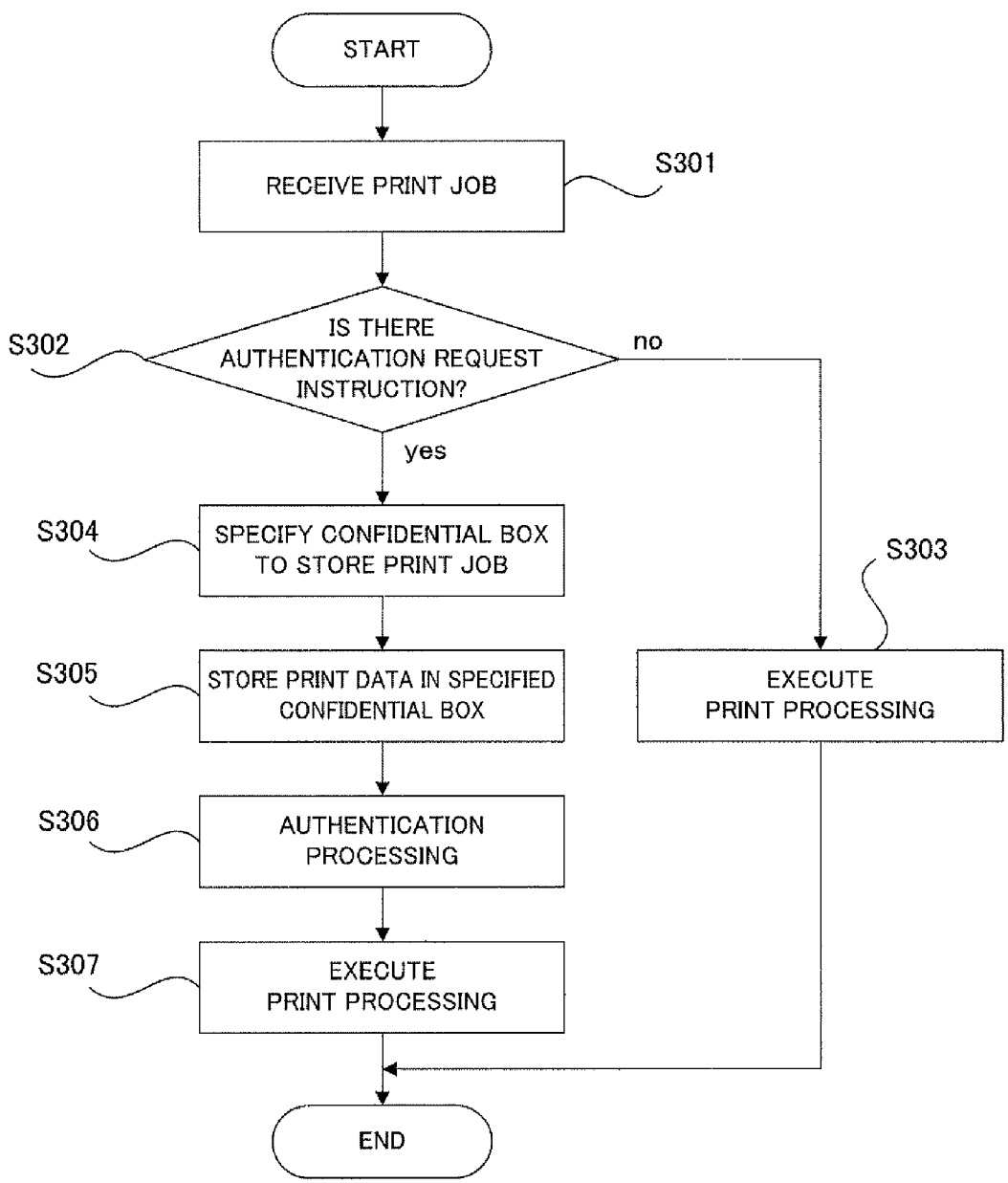
FIG. 16 is a flowchart for explaining operation of the image forming apparatus 30 that has received the print job.

In addition, the operation at the time when the print job with the authentication request instruction added thereto in this manner is received in the image forming apparatus 30, will be described with reference to the flowchart of FIG. 16.

When the print job from the print server 20 is received by the print job receiving part 51 and stored in the print job storage part 52 (step S301), the controller 53 determines whether or not an authentication request instruction is added to the print job (step S302).

When it is determined at step S302 that no authentication request instruction is added to the received print job, normal print processing, without an authentication request, is executed, and the output part 55 performs the image output processing based on the received print job (step S303).

When it is determined at step S302 that an authentication request instruction is added to the received print job, a confidential box to store the print job is specified (step S304), and the print data is stored in the specified confidential box (step S305).

When a user executes the image output processing of the print job, an authentication request such as an input request of a password is made. If normal authentication processing is performed (step S306), the output part 55 performs the image output processing based on the received print job (step S307).

Second Exemplary Embodiment

A printing system according to a second exemplary embodiment of the present invention will be described.

The printing system according to the first exemplary embodiment is configured to add information indicating the print data requiring the authentication for performing the print processing (authentication request instruction) to the print data as the authentication information required for performing print processing based on the print data. The printing according to the second exemplary embodiment will be described, which is performed while adding the information necessary for authentication of the retriever, the password and the like in the print server 20 on the assumption that all the print data requires the authentication for performing print processing.

The basic configuration of the printing system according to the exemplary embodiment is substantially the same as that of the first exemplary embodiment as described above. The description of a similar configuration, thus, will be made using the same codes.

In the print server 20 according to the exemplary embodiment, the determination condition setting part 41 sets the determination condition for adding the authentication information required for performing the print processing based on the received print job. The authentication information required for performing print processing denotes the information necessary for authentication processing so as to confirm that the user who has instructed the print processing at the time of instruction thereof is the designated user like the identification information for identifying the user who performs the print processing.

When the determination part 45 determines that the print job received by the print job receiving part 43 matches the security determination condition, the authentication information adding part 46 of the print server 20 according to the exemplary embodiment adds the information such as the authentication ID of the user to the print job as the authentication information.

FIG. 17 shows an example of the determination condition table to be stored in the determination condition storage part 42 according to the exemplary embodiment.

In the exemplary embodiment, the security determination condition is set using the method similar to that of the first exemplary embodiment as described above. In the exemplary embodiment, however, since all the print data is set to require authentication for performing the print processing, the security determination condition only sets the retriever while setting no necessity of the authentication request.

For example, in the case of the print job where "September's bill" is set as the print job name and "Osaka branch" is set as the output destination, "User A" is set as the retriever. In the case of the print job where "summer vacation schedule" is set as the print job name and "Sapporo branch" is set as the output destination, no retriever is designated. This does not mean that the authentication processing is unnecessary for performing the print processing, but means that the print processing is not started upon transfer of the aforementioned print job to the image forming apparatus as the output destination. The print processing will be performed when an arbitrary user has performed the authentication processing.

The authentication information adding part 46 according to the exemplary embodiment adds the authentication information of User A's authentication ID to the print job as the identification information for identifying User A.

The specific operation performed by the authentication information adding part 46 at the time of adding the authentication information to the print data will be described. In the exemplary embodiment, the authentication processing using the IC card rather than the confidential box will be described.

FIG. 18 shows the installation state of the IC card authentication device in the image forming apparatuses 30 to 32. Specifically, the drawing shows that the IC card authentication device is installed in each of the image forming apparatuses 30 and 32, and is not installed in the image forming apparatus 31.

It is assumed that the correspondence between authentication IDs (employee codes) and the users A to Z is set as shown in FIG. 19. That is, each of the users A to Z receives the IC card which stores the corresponding employee code as the authentication ID.

Based on the information as shown in FIGS. 18 and 19, the authentication information adding part 46 adds the authentication information such as the retriever and the authentication ID to the print job to be transferred by the transfer part 47 as shown in FIG. 20, for example.

For example, in the case where "User A" is set as the retriever based on the determination result of the determination part 45, if the output destination is set to the image forming apparatuses 30 and 32, the "xy02184" is set as the authentication ID. However, even in the case where "User A" is set as the retriever, if the output destination is set to the image forming apparatus 31, the authentication information is not added to the print data because the IC card authentication device is not installed in the image forming apparatus 31. The print data to which no authentication information has been added cannot be subjected to the authentication processing. Therefore, the print data is temporarily stored in the print server 20 without being transferred to the image forming apparatus 31.

Likewise, in the case where "User B" is set as the retriever, if the output destination is set to the image forming apparatuses 30 and 32, the "xy09432" is set as the authentication ID. In the example shown in FIG. 20 where the output destination is set to the image forming apparatuses 30 and 32 each having the IC card authentication device installed, the same authentication ID is set to the respective users. However, a different ID may be set for each of the image forming apparatuses.

Operation of the printing system according to the exemplary embodiment will be described in detail with reference to the drawings.

Operation of the print server 20 in the printing system according to the exemplary embodiment will be described with reference to the flowchart shown in FIG. 21.

Figure 11:
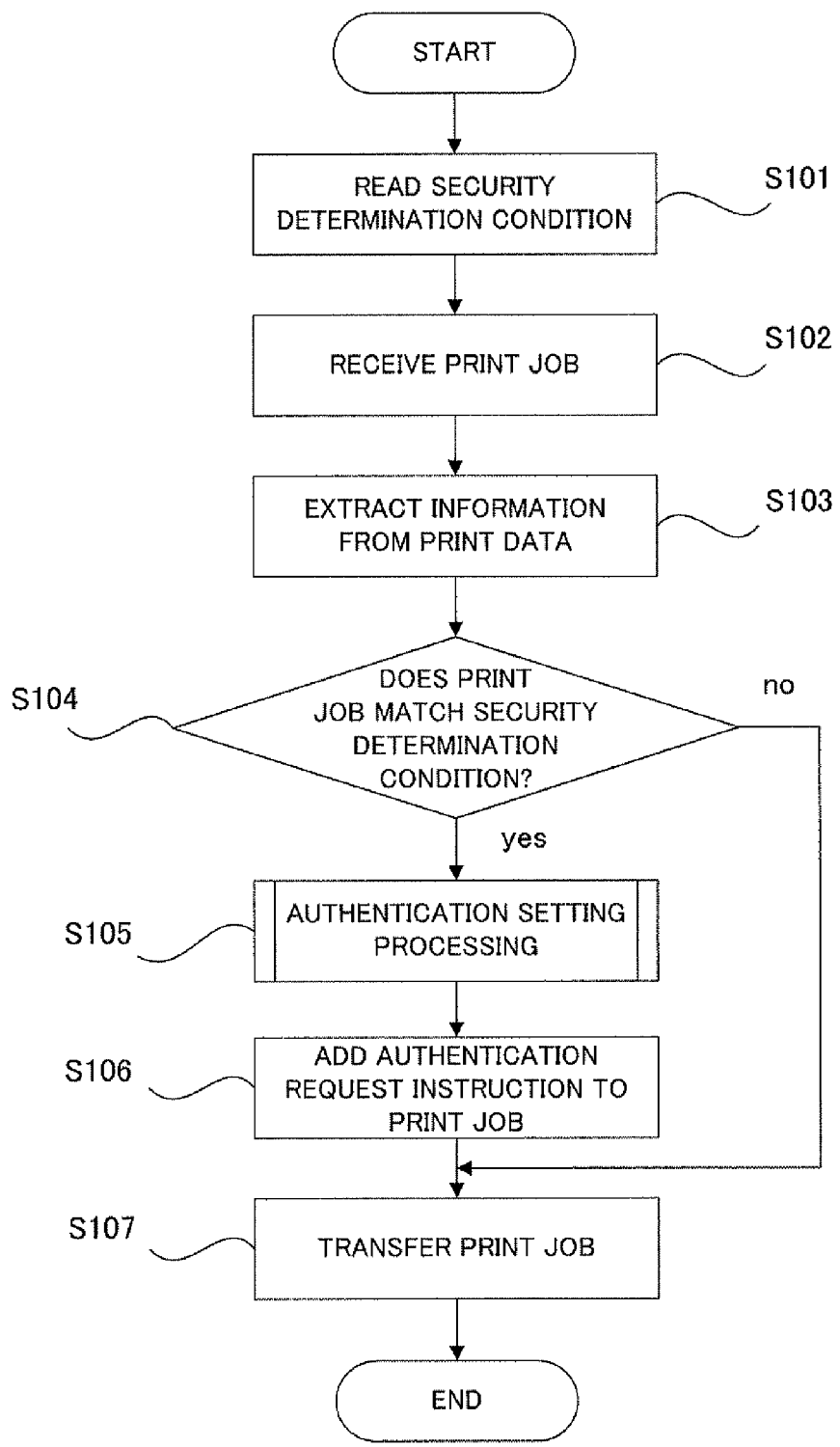
FIG. 11 is a flowchart for explaining operation of the print server 20 in the printing system according to the first exemplary embodiment of the present invention.
Figure 21:
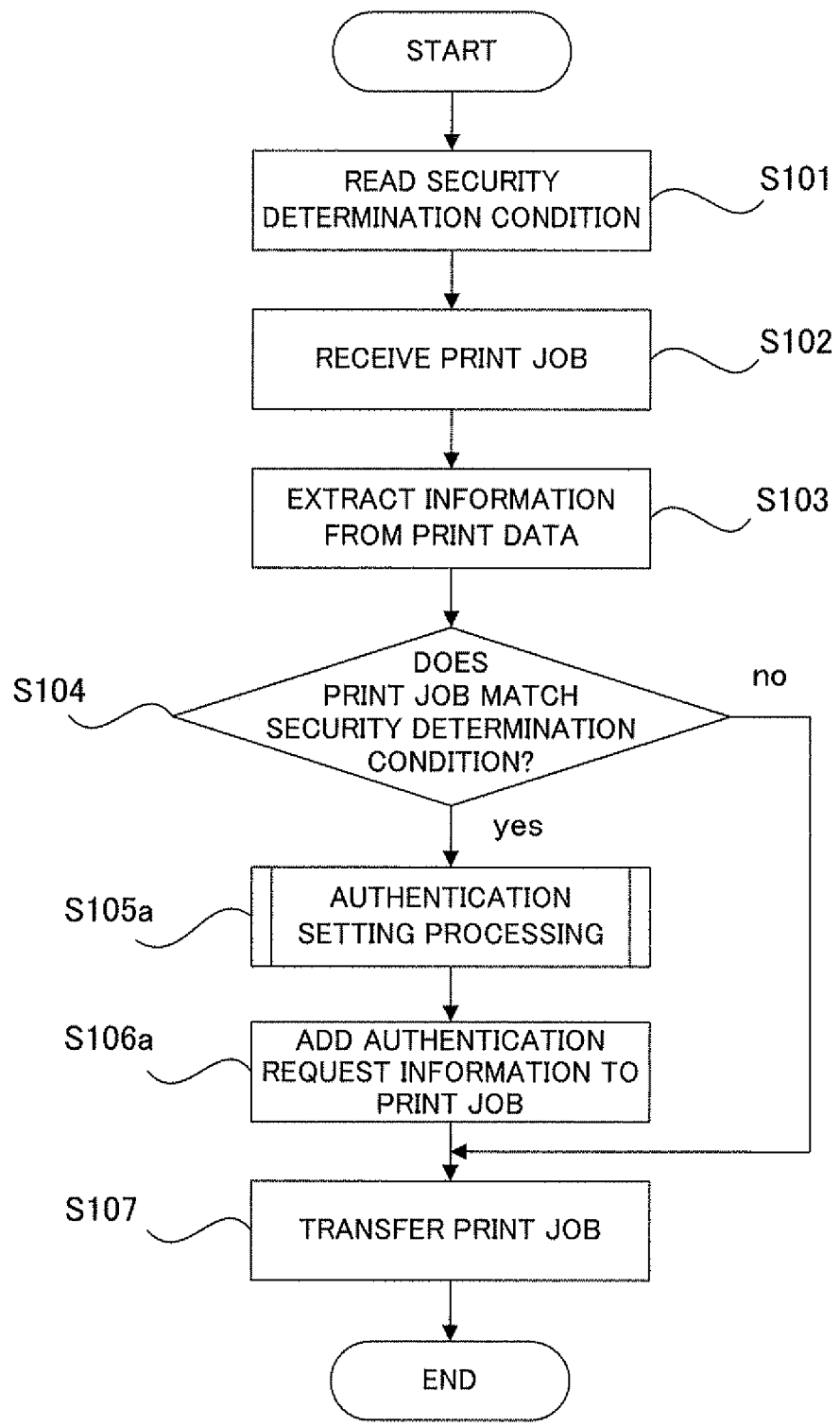
FIG. 21 is a flowchart for explaining operation of the print server 20 in the printing system according to the second exemplary embodiment of the present invention.

The flowchart shown in FIG. 21 is formed by replacing processing in steps S105 and S106 of the flowchart according to the first exemplary embodiment shown in FIG. 11 with that in steps S105a and S105a. Only the explanation with respect to those steps S105a and S106a will be made hereinafter.

Figure 22:
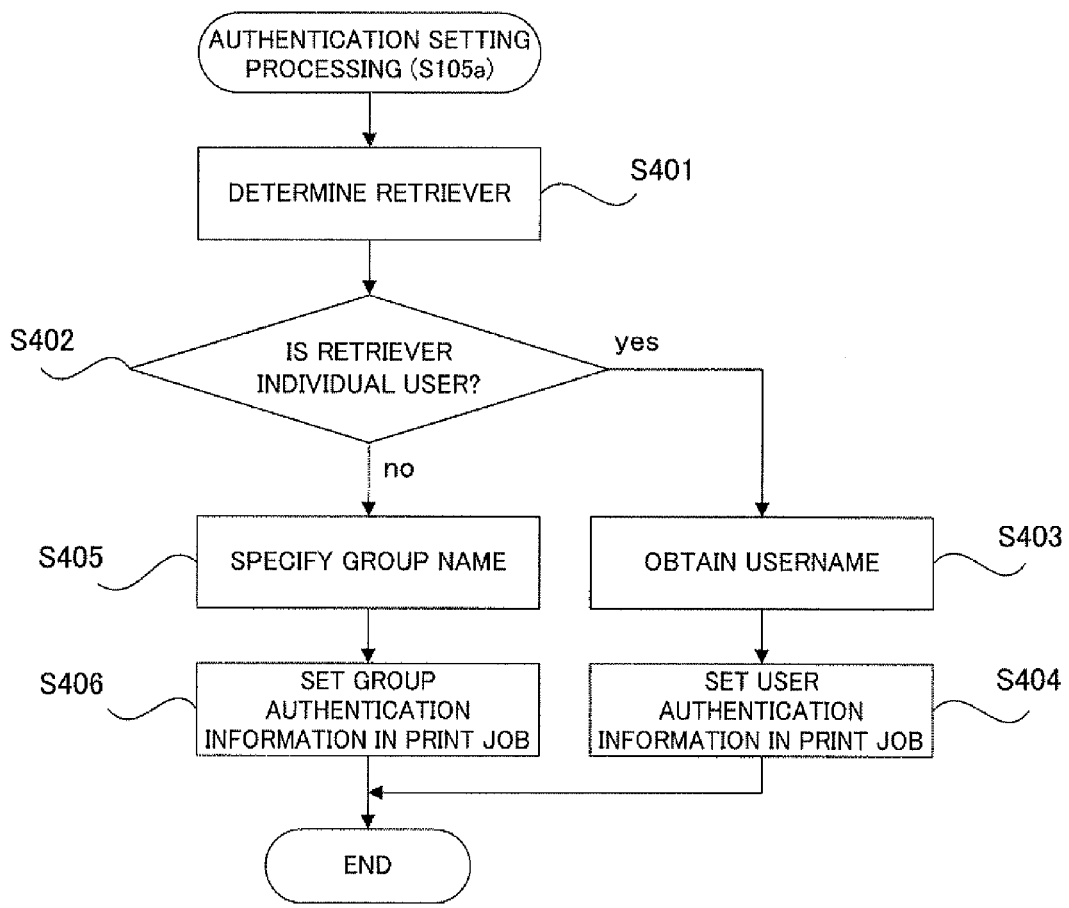
FIG. 22 is a flowchart for explaining the authentication setting processing shown in step S105a of FIG. 21 in detail.

The authentication setting processing in step S105a shown in FIG. 21 will be described in detail with reference to the flowchart shown in FIG. 22.

In the authentication setting processing, the retriever is determined based on the security determination condition table as shown in FIG. 17 (step S401). If the determined retriever is an individual (Yes in step S402), the username is obtained. Then the authentication ID of the user is obtained and set as the user authentication information (steps S403 and S404).

In step S402, if it is determined that the retriever is not an individual but a group (No in step S402), the group name is specified, and the information such as the group name is set as the group authentication information to the print job (steps S405 and S406).

Figure 23:
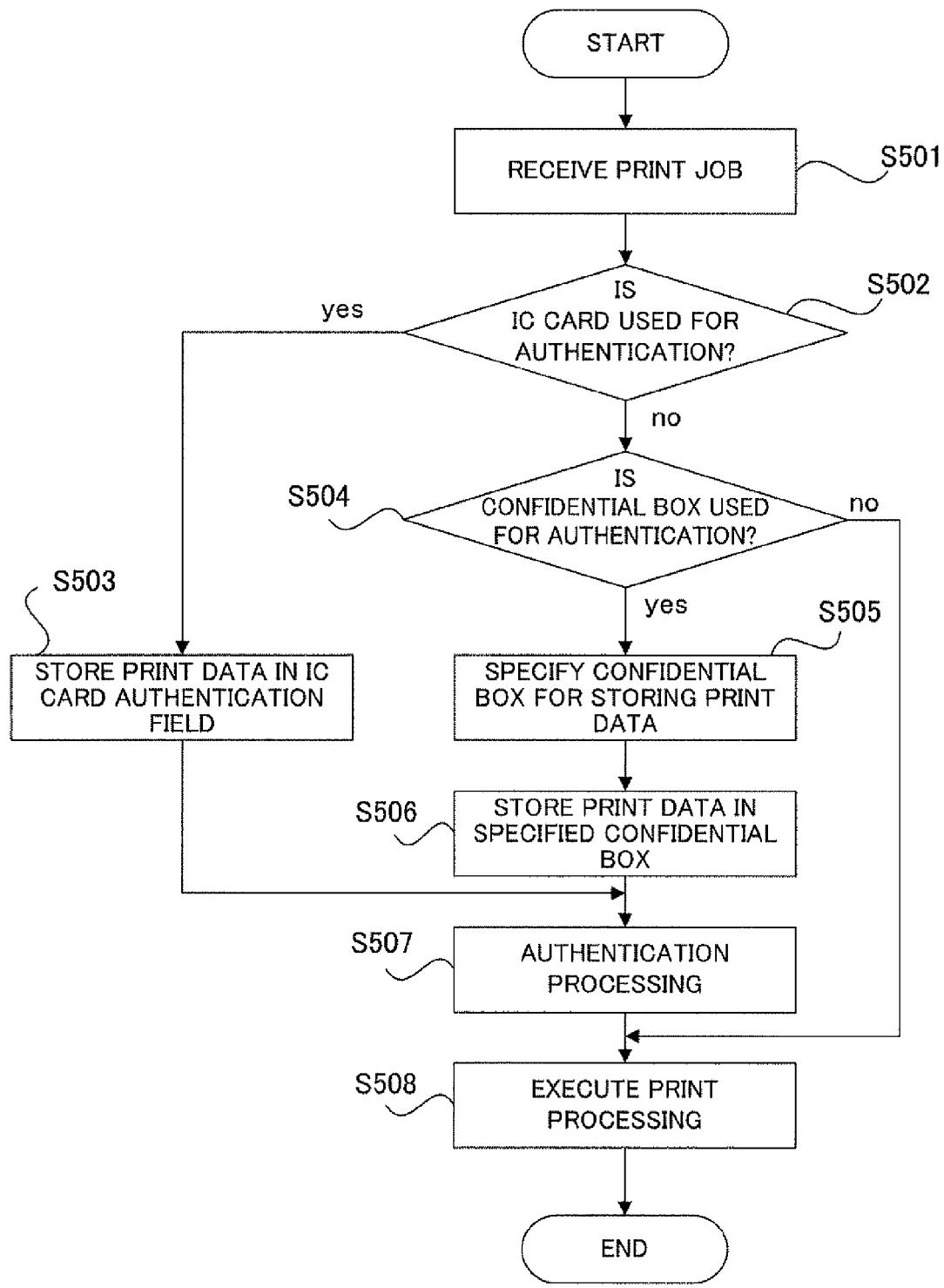
FIG. 23 is a flowchart for explaining operation of the image forming apparatus 30 that has received the print job according to the second exemplary embodiment of the present invention.

Operation to be performed when the image forming apparatus 30 receives the print job to which the authentication information has been added will be described with reference to the flowchart shown in FIG. 23.

When the print job from the print server 20 is received by the print job receiving part 51, and further stored in the print job storage part 52 (step S501), the controller 53 refers to the authentication information added to the print job. It is then determined whether or not the designated authentication method is the authentication using the IC card (step S502).

If it is determined in step S502 that the designated authentication method is the authentication using the IC card, the print data will be stored in the IC card authentication field of the image forming apparatus 30 (step S503).

If it is determined in step S502 that the designated authentication method is not the authentication using the IC card, the controller 53 refers to the authentication information added to the print job. It is then determined whether or not the designated authentication method is the authentication using the confidential box (step S504).

If it is determined in step S504 that the designated authentication method is the authentication using the confidential box, the confidential box for storing the print data is specified (step S505). Then the print data is stored in the specified confidential box (step S506).

The print data stored in the IC card authentication field is subjected to the authentication processing by reading the authentication ID within the IC card using an IC card reader and the like, and determining whether or not the ID matches the authentication ID contained in the authentication information (step S507). The print data stored in the confidential box is subjected to the authentication processing by sending a request for entry of the password, and determining whether or not the entered password matches the password contained in the authentication information (step S507).

If the normal authentication processing has been made using any one of the authentication methods, the output part 55 executes the image output processing based on the received print job (step S508).

If it is determined that the authentication method designated in step S504 is not the authentication using the confidential box, it is determined that the print job is normal without making the authentication request. The output part 55 performs the image output processing based on the received print job without making the authentication request (step S508).

[Modification]

Figure 24:
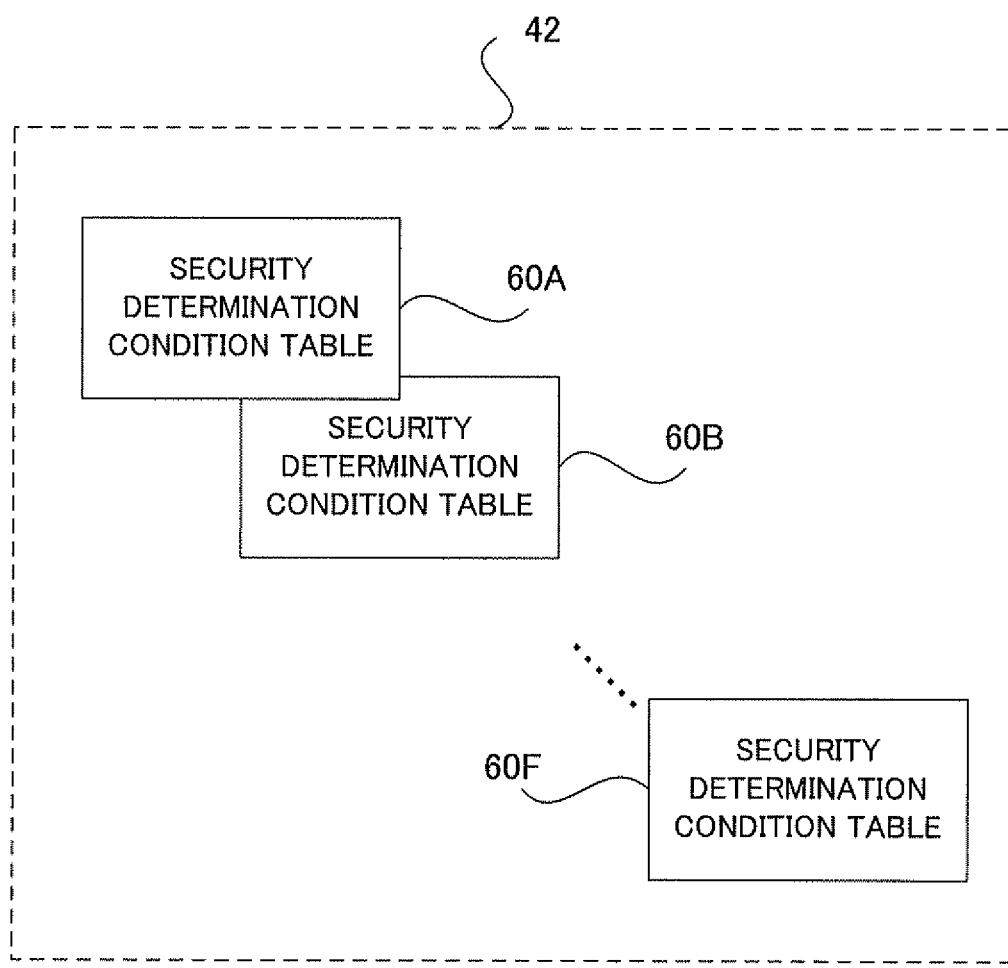
FIG. 24 shows a case of storing plural security determination condition tables in a determination condition storage part 42.

The first and the second exemplary embodiments each using the single security determination condition table have been described. However, the present invention is not limited to be configured as described above. For example, plural security determination condition tables may be stored in the determination condition storage part 42 as shown in FIG. 24. In the example shown in FIG. 24, six security determination condition tables 60A to 60F are stored in the determination condition storage part 42. In the aforementioned configuration, one of those six security determination condition tables 60A to 60F stored in the determination condition storage part 42 will be selected. Then in the determination part 45, it is determined whether or not the print job matches the determination condition based on the selected security determination condition table.

Figure 25:
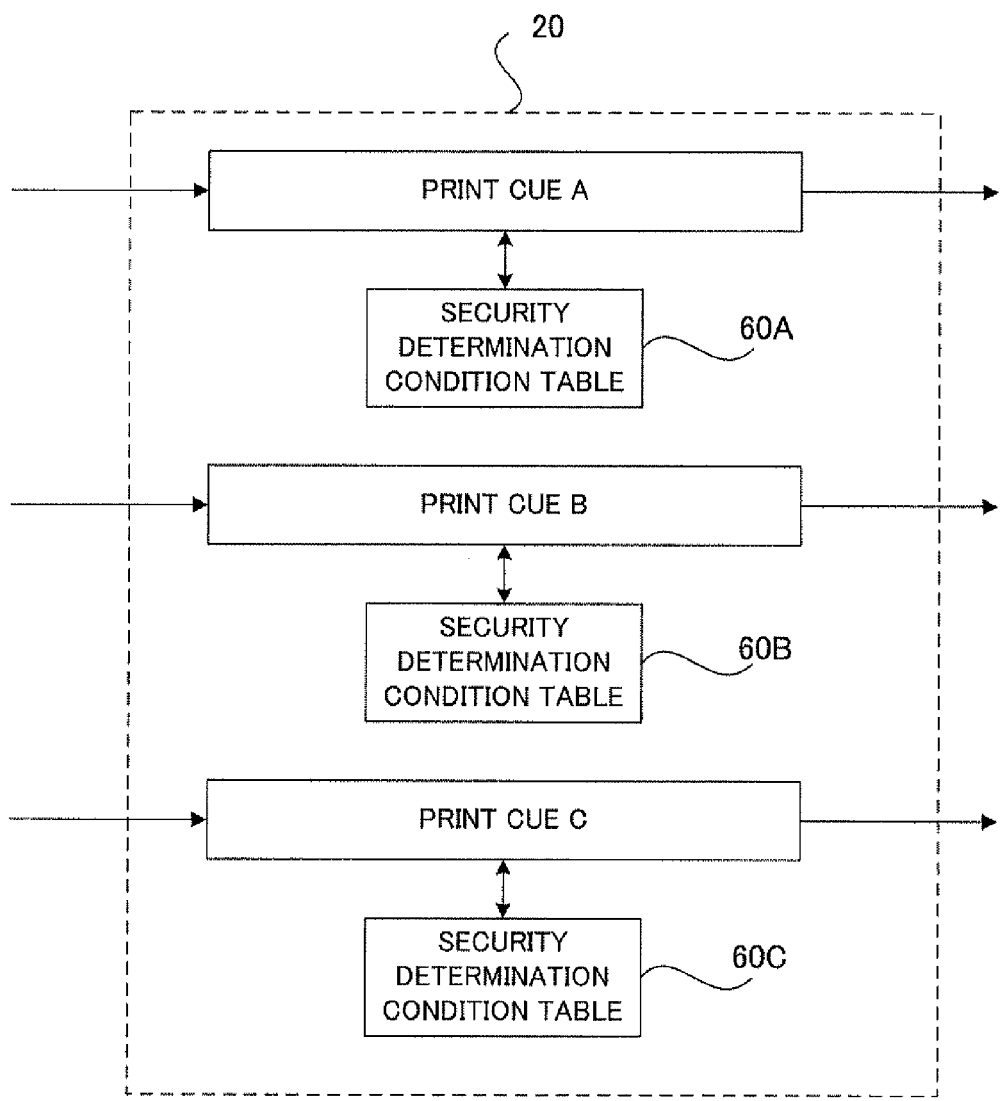
FIG. 25 shows a case of applying different security determination condition tables to print cues A to C formed in the print server 20.

The use of the plural security determination condition tables allows the different security determination condition tables to be applied to print cues A to C formed in the print server 20 as shown in FIG. 25, for example.

In the example shown in FIG. 25, the authentication information is added to the print job stored in the print cue A based on a security determination condition table 60A, and the authentication information is added to a print job stored in the print cue 60B based on the security determination condition table B.

Likewise, the determination may be made using a different security determination condition table for each of the logical printers, or each of the input protocols. The determination may further be made using a different security determination condition table for each of the terminal devices as the transmission source for transmitting the print job.

The terminal device 10 as the transmission source of the print data may be configured to designate the security determination condition table for making the determination through selection from those plural security determination condition tables.

Figure 26:
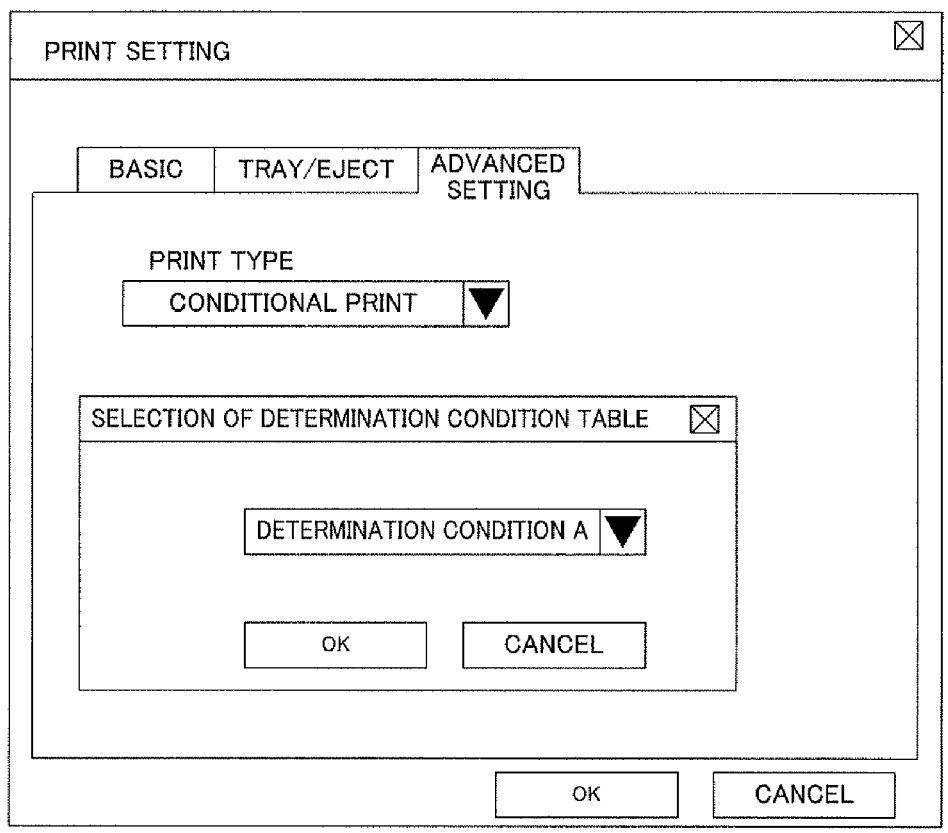
FIG. 26 shows a display screen of a terminal device 10 that is used for designating the security determination condition table to be applied from the plural security determination condition tables.

The terminal device 10 may be configured to select and designate the security determination condition table to be applied on the screen as shown in FIG. 26 so as to allow the print server 20 to specify the security determination condition table for use from those plural security determination condition tables based on the designation. In the example shown in FIG. 26, the security determination condition table titled "determination condition A" is selected.

Further, in the above-described first and second exemplary embodiments, the print server 20 determines whether or not the print job matches the security determination condition. However, the image forming apparatuses 30 to 32 may execute the determination processing. In the case configured in such a manner, the functions of the information extracting part 44, the determination condition setting part 41, the determination part 45, or the like, in the print server 20 are installed in each of the image forming apparatuses 30 to 32. The determination condition setting part 41 in each of the image forming apparatuses 30 to 32 sets a determination condition to specify authentication information required for performing print processing based on the print job. Also, if the determination part 45 determines that the print job matches the security determination condition, the authentication processing executing part 54 specifies authentication information and executes authentication processing before execution of the print job by the output part 55.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a central processing unit (CPU); and
a memory;
a setting unit that sets a determination condition for adding authentication information necessary for performing print processing based on received print data;
an extracting unit that extracts specific information from image data to be printed;
a determination unit that determines, after the extracting unit extracts the information, whether or not the information extracted by the extraction unit matches the determination condition set by the setting unit; and, if it is determined that the print data matches the determination condition, the determination unit specifies a retriever and determines whether or not the retriever is an individual or a group; and
an adding unit, wherein:
if it is determined by the determination unit that the print data matches the determination condition, and if it is determined by the determination unit that the retriever is an individual, the adding unit obtains a password corresponding to the retriever from a user list and adds a username and password to the print data as the authentication information;
if it is determined by the determination unit that the print data matches the determination condition, and if it is determined by the determination unit that the retriever is a group, the adding unit specifies a group name and adds the group name to the print data as the authentication information,
wherein the authentication information includes information indicating whether or not authentication is necessary for performing the print processing based on the print data.

2. The print control apparatus according to claim 1, wherein the authentication information includes identification information for identifying a user who performs the print processing based on the print data.

3. The print control apparatus according to claim 1, further comprising a transmission unit that transmits the print data to which the authentication information has been added by the adding unit to a printing device for the print processing.

4. The print control apparatus according to claim 1, wherein the setting unit sets the determination condition whether or not any one of, or a combination of at least two or more of, a print data name, a heading, an output destination, a username, and a customer's name matches preset information.

5. The print control apparatus according to claim 1, further comprising:
a storage unit that stores a plurality of different determination conditions for adding the authentication information; and
a selection unit that selects one of the plurality of determination conditions stored in the storage unit,
wherein the determination unit determines whether or not the print data matches the determination condition selected by the selection unit.

6. The print control apparatus according to claim 1, wherein the image data to be printed is banner sheet data, form page data, or separator data.

7. An image forming apparatus comprising:
a central processing unit (CPU); and
a memory;
an output unit that outputs an image based on received print data;
a setting unit that sets a determination condition for specifying authentication information necessary for performing print processing based on the print data;
an extracting unit that extracts specific information from image data to be printed
a determination unit that determines, after the extracting unit extracts the information, whether or not the information extracted by the extraction unit matches the determination condition set by the setting unit and, if it is determined that the print data matches the determination condition, the determination unit specifies a retriever and determines whether or not the retriever is an individual or a group;
an adding unit, wherein:
if it is determined by the determination unit that the print data matches the determination condition, and if it is determined by the determination unit that the retriever is an individual, the adding unit obtains a password corresponding to the retriever from a user list and adds a username and password to the print data as the authentication information;
if it is determined by the determination unit that the print data matches the determination condition, and if it is determined by the determination unit that the retriever is a group, the adding unit specifies a group name and adds the group name to the print data as the authentication information, and
an authentication processing execution unit that, if the determination unit determines that the print data matches the determination condition, identifies the authentication information and executes authentication processing using the authentication information before execution of the print data by the output unit,
wherein the authentication information includes information indicating whether or not authentication is necessary for performing the print processing based on the print data.

8. The image forming apparatus according to claim 7, wherein the image data to be printed is banner sheet data, form page data, or separator data.

9. A non-transitory computer readable medium storing a program causing a computer to execute a process comprising:
setting a determination condition for adding authentication information necessary for performing print processing based on received print data;
extracting specific information from image data to be printed;
determining, after the extracting of the information, whether or not the extracted information matches the determination condition previously set and, if it is determined that the print data matches the determination condition, specifying a retriever and determining whether or not the retriever is an individual or a group; and adding the authentication information to the print data, wherein:

if it is determined by the determination unit that the print data matches the determination condition, and if it is determined by the determination unit that the retriever is an individual, the authentication information is added to the print data by obtaining a password corresponding to the retriever from a user list and adding a username and password to the print data as the authentication information;

if it is determined by the determination unit that the print data matches the determination condition, and if it is determined by the determination unit that the retriever is a group, the authentication information is added to the print data by specifying a group name and adding the group name to the print data as the authentication information, wherein the authentication information includes information indicating whether or not authentication is necessary for performing the print processing based on the print data.

10. The computer readable storage medium according to claim 9, wherein the image data to be printed is banner sheet data, form page data, or separator data.

* * * * *